United States Patent Office 2,717,639
Patented Sept. 13, 1955

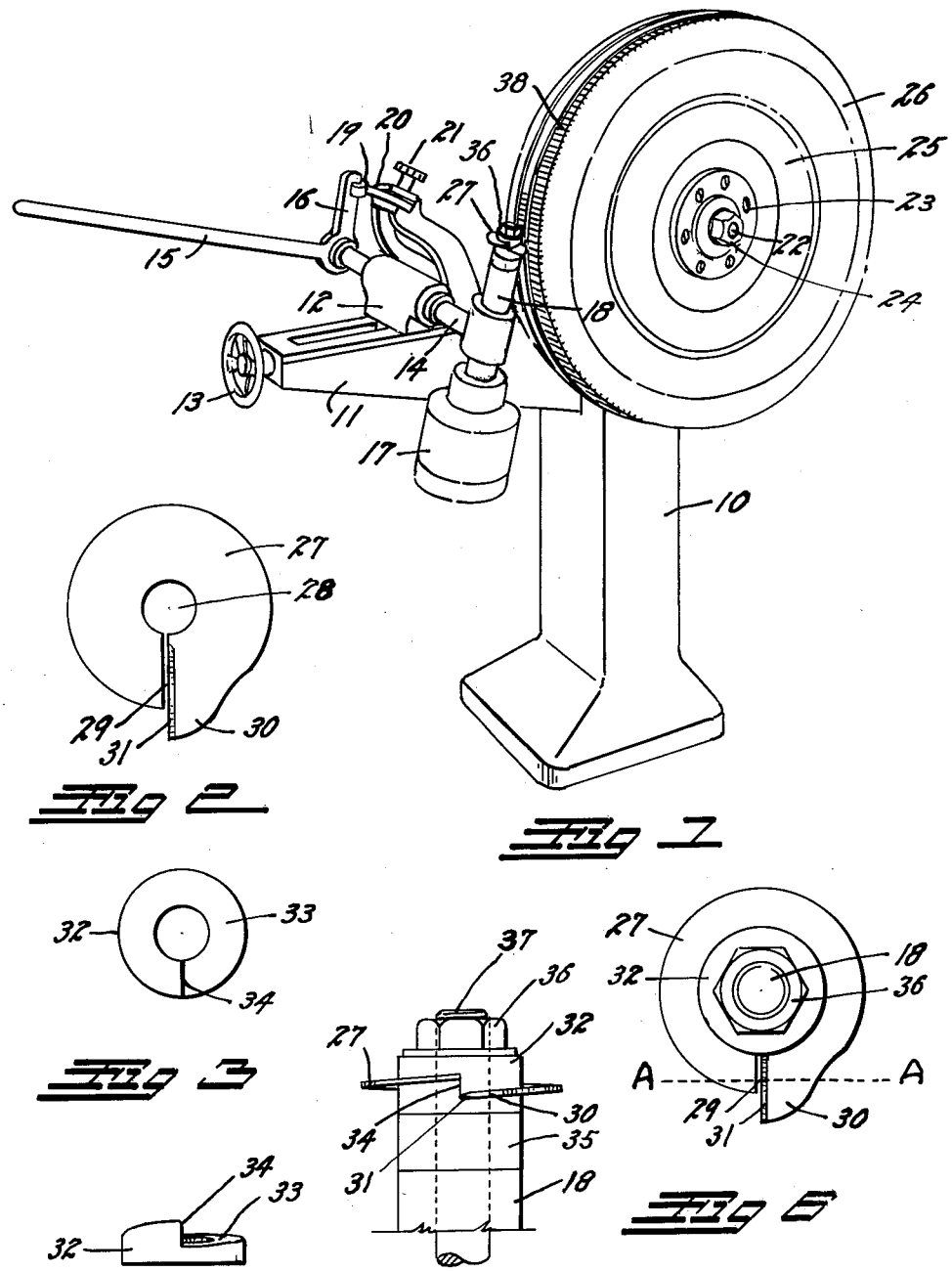

2,717,639

RADIALLY SPLIT DISC FORMED INTO A SPIRAL FOR SIPING TIRES

Volney L. James, Littleton, Colo., assignor to O. K. Rubber, Inc., Littleton, Colo., a corporation of Colorado Application April 27, 1953, Serial No. 351,386

2 Claims. (Cl. 164—10.2)

This invention relates to a device for forming a plurality of uniformly spaced knife cuts in the tread of an automotive vehicle tire, and to a knife construction for forming the cuts. Such cuts have become known as "sipes" and the process is known as "siping," the word being derived from an early patent, No. 1,452,099, of which J. F. Sipe was the patentee.

The principal object of this invention is to provide a highly efficient, simple, easily used device which will accurately and uniformly cut spaced knife cuts in the tire tread, and in which the cutting knife will act to simultaneously cut and rotate the tire being cut to produce uniform and uniformly spaced sipes therein.

A further object is to provide a rotary cutter or siping knife which can be used upon a tire truing machine of the type illustrated in Patent No. 2,601,810.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a perspective view, illustrating the improved device as it would appear in use on a conventional tire casing;

Fig. 2 is a top view of an improved cutting knife employed in the improved device;

Fig. 3 is a top view of a spiral washer as used in connection with the improved knife;

Fig. 4 is a side view of the washer of Fig. 3;

Fig. 5 is a side view of the assembled cutting knife and washer ready for use; and Fig. 6 is a top view of the assembly of Fig. 5.

The improved tire siping device is mounted on a supporting standard 10 from which a cross-head table 11 projects. A cross-head 12 is arranged to be moved along the table 11 by means of a suitable hand wheel 13. The cross-head 12 supports a transverse, longitudinally movable, rotatable shaft 14. A motor sleeve 18 is transversally and fixedly mounted on one extremity of the shaft 14, and on the other extremity thereof a handle 15 and a cam follower lever 16 is fixedly mounted. The motor sleeve 18 supports an electric motor 17 which drives a motor shaft 37 which extends through and projects upwardly from the motor sleeve 18.

The cam follower lever 16 carries a roller 19 positioned to follow a cam 20 held in place by means of a cam locking nut 21. The contour of the cam 20 corresponds to the lateral contour of the tire tread being worked upon.

The standard 10 supports an axle stub 22 upon which a wheel hub 23 is rotatably supported and held in place by means of a terminal nut 24. The hub 23 is designed to support a conventional automotive vehicle wheel 25 carrying a conventional tire casing 26.

The improved siping knife is designed to be mounted on the upper extremity of the motor shaft 37 and comprises a thin, flexible, hardened steel disc 27 having a central shaft opening 28 for receiving the motor shaft 37. The disc 27 is split radially, as indicated at 29, so that it may be flexed sidewardly into a spiral path. The disc 27 is provided with a projecting knife portion 30 along one side of the split 29. The radially extending edge of the knife portion 30 is beveled or sharpened to form a sharp knife edge 31.

In use, the disc 27 is clamped between two similar, upper and lower clamping washers 32. One face of each of the washers 32 is flat, the opposite face is formed with a spiral surface 33, the high and low points of which are joined by means of a vertical joining wall 34. The lower washer 32 is positioned with its flat face against a set collar 35 or other abutment on the motor shaft 37, and with its spiral surface 33 directed upwardly. The disc 27 is then placed on the spiral surface of the lower washer 32 so that its sharpened edge 31 will be positioned against the vertical wall 34 thereof. The second washer 32 is then placed over the disc 27, with the spiral face 33 directed downwardly, and the second washer is clamped against the disc by means of a suitable clamping nut 36. As the nut 36 is tightened, the two washers will approach each other to distort the disc 27 to conform to the pitch of the spiral faces 33 of the washer 32, as shown in Fig. 5.

A cam 20, corresponding to the transverse contour of the casing 26, is locked in position by the nut 21. The motor 17 is started and the hand wheel 13 is rotated to force the disc 27 toward the tread of the tire casing 26 until the wheel knife portion 30 cuts through the tread to a depth slightly in excess of the amount of projection of the knife portion, so that the remainder of the disc 27 will enter the cut made by the knife edge 31. The approximate depth of entrance is indicated by the broken line A—A, Fig. 6.

It will be noted that the sharpened edge of the knife portion 30 will swing across a portion of the width of the tread of the casing 26, making knife cuts therein, as indicated at 38 in Fig. 1. The spiral disc 27 will enter the cuts and follow through the cut on a spiral. Before the disc leaves the last cut, the knife portion 30 will have started the next successive cut, so that for each cut the casing 26 will be rotated a distance equal to the height of the vertical wall 34 of the washer 32. Thus, the cuts or "sipes" will be uniformly spaced throughout the entire circumference of the tread, the spacing being equal to the pitch of the spiral of the disc 27. The spiral can be pitched in either direction by varying the position of the washers, and the pitch can be varied by using different sets of the washers 32 having different pitches.

As illustrated, clockwise rotation of the motor shaft 37 will rotate the portion of the tread facing the operator upwardly so that he may observe the cuts or "sipes" as they rise upwardly from the disc 27.

The disc is held against the tire tread by upward movement of the handle 15. After a complete circumferential path has been completed, the cross-head 12 is moved sidewardly to an adjacent path and the process repeated until the full width of the tread has been "siped." The cam 20 determines the depth of the knife as it moves to adjacent paths across the tread.

It will be noted that the cutting disc operates against a freely rotating wheel tread, since the action of the cutting disc serves to rotate the wheel and tread.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A tire siping knife comprising: a shaft; a thin, flexible, circular, normally flat, hardened steel disc having a central opening through which said shaft extends, said disc being split radially to form a trailing extremity and a leading extremity said extremities being axially separated on said shaft so that said disc forms a spiral about said shaft; an outwardly projecting knife portion formed on said disc at the leading extremity thereof and acting to increase the radial width of the leading extremity beyond the width of the trailing extremity so that said leading extremity will project radially outward beyond the circumference of said disc; and a sharpened radially-extending knife edge formed on said projecting knife portion, so that when said disc is rotated against a tire, the projecting knife portion will form a relatively deep cut therein while the remainder of the circumference of said disc will but partially enter said cut and follow said knife portion therethrough.

2. A tire siping knife as described in claim 1 having two similar clamping washers, one washer being positioned on said shaft at each side of said disc; a flat face on each washer distant from said disc; annular, spiral, complementary faces on said washers adjacent said disc, said spiral faces being inclined at an angle to the plane of said flat faces and terminating in high and low extremities; and a joining wall extending between the high and low extremities of each spiral face, said joining walls lying in the longitudinal plane of the axis of said washers and being positioned on opposite sides of the split in said disc so that when said two washers are clamped against said disc, the leading and trailing extremities thereof will be offset by said joining wall and the remainder of said disc will lie in a spiral against and along the spiral faces of said washers.

References Cited in the file of this patent

UNITED STATES PATENTS

| | | |
|---|---|---|
| 619,530 | Atwood | Feb. 14, 1899 |
| 737,430 | Lyon | Aug. 25, 1903 |
| 1,168,767 | Unruh | Jan. 18, 1916 |
| 1,474,153 | Klein | Nov. 13, 1923 |
| 1,483,641 | Montgomery et al. | Feb. 12, 1924 |
| 2,158,167 | Wikle | May 16, 1939 |
| 2,406,553 | Mader | Aug. 27, 1946 |
| 2,575,450 | Huff | Nov. 20, 1951 |